United States Patent [19]
Smith

[11] 3,874,485
[45] Apr. 1, 1975

[54] OLEO-PNEUMATIC SHOCK ABSORBER

[75] Inventor: George O. Smith, Ferndale, Mich.

[73] Assignee: General Motors Corporation, Detroit, Mich.

[22] Filed: Oct. 23, 1973

[21] Appl. No.: 408,677

Related U.S. Application Data

[62] Division of Ser. No. 249,612, May 1, 1972, Pat. No. 3,798,744.

[52] U.S. Cl............... 188/298, 188/315, 267/64 R
[51] Int. Cl................................................ F16f 9/08
[58] Field of Search.......... 188/298, 315; 267/64 R, 267/64 A; 220/9 R

[56] References Cited
UNITED STATES PATENTS

| | | |
|---|---|---|
| 2,802,664 | 8/1957 | Jackson.......................... 188/298 X |
| 3,331,601 | 7/1967 | Riehl................................ 267/64 A |
| 3,387,856 | 6/1968 | Guilhamat et al............ 267/64 A X |
| 3,536,312 | 10/1970 | Lohr................................. 267/64 R |
| 3,547,465 | 12/1970 | Hoffman et al................. 267/64 R |

Primary Examiner—George E. A. Halvosa
Attorney, Agent, or Firm—C. R. White

[57] ABSTRACT

In a preferred form a combination air oil shock absorber having an inner liquid-filled cylinder tube surrounded by a flexible bladder and including passageway means between the tube and bladder for directing pressurized gas into a gas space between the tube and bladder. An outer cylinder surrounds the bladder and forms a liquid-filled reservoir therewith. An end cap assembly is secured to the outer cylinder having dual high pressure seals to close the liquid-filled reservoir and to seal the gas inlet between the tube and bladder.

4 Claims, 4 Drawing Figures

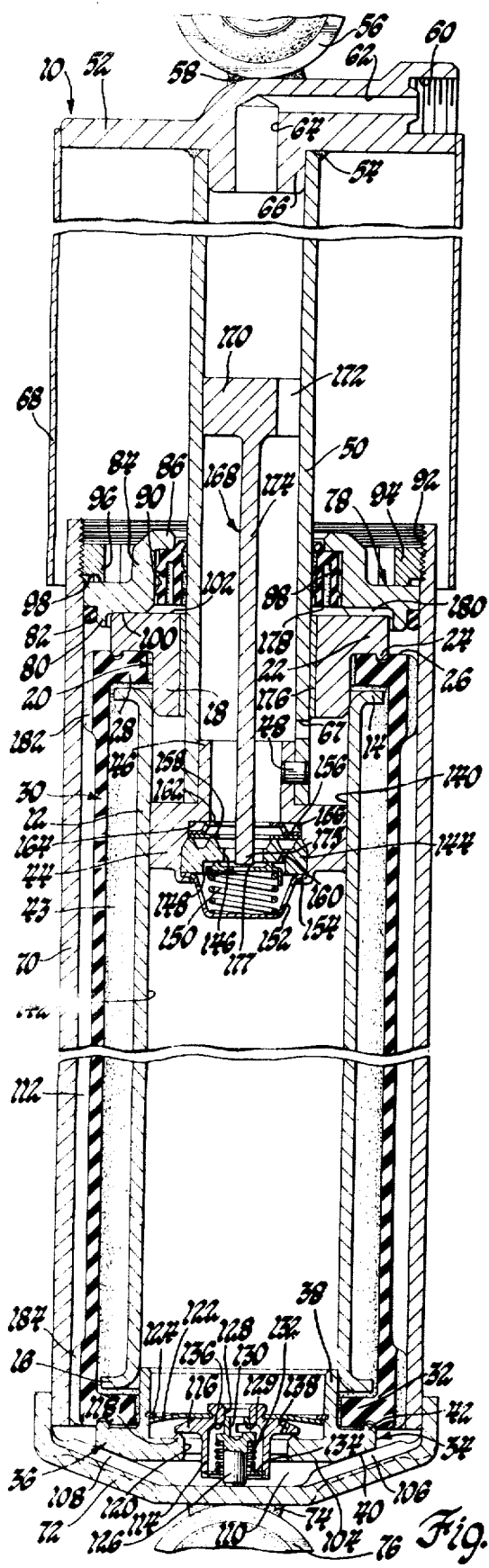
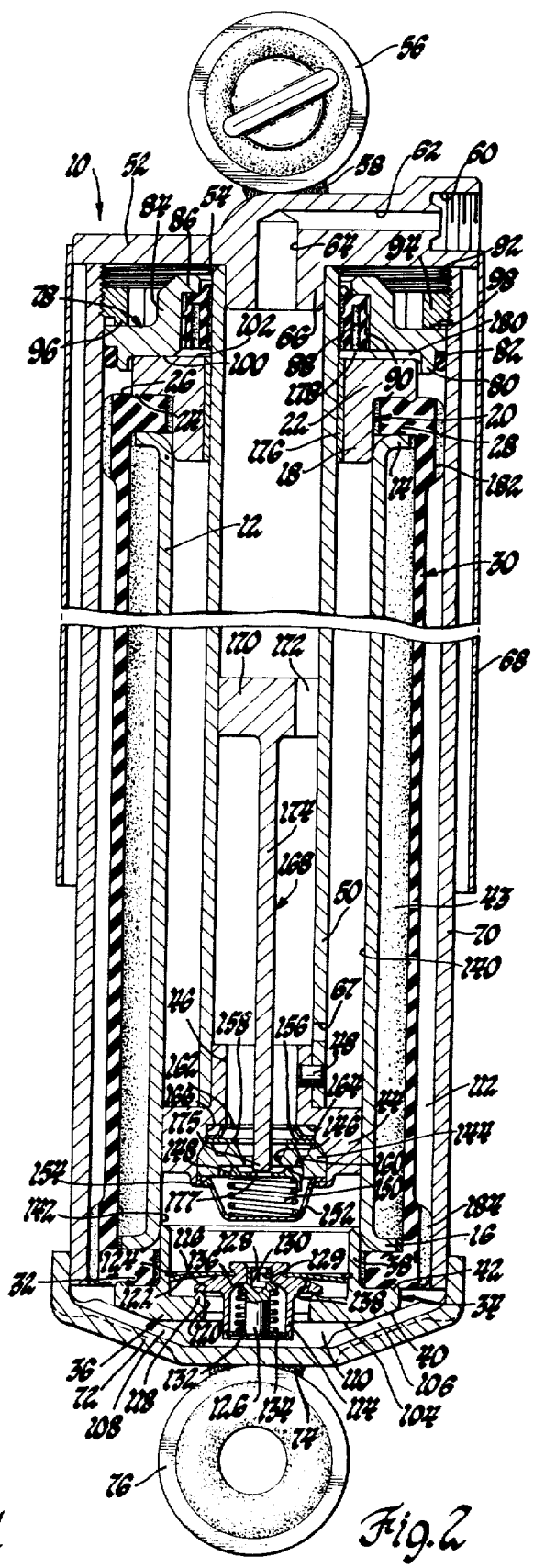

OLEO-PNEUMATIC SHOCK ABSORBER

This is a division of application Ser. No. 249,612, filed May 1, 1972 now U.S. Pat. No. 3,798,744, issued Mar. 26, 1974 and entitled Procedure for Charging an Oleo-Pneumatic Shock Absorber.

This invention relates to combination gas and liquid vehicle suspension devices and more particularly to such devices having a gas space formed in surrounding relationship to an oil-filled inner cylinder tube by a diaphragm of a variable volume liquid-filled reservoir chamber in which liquid is filled or exhausted to vary the gas space pressure.

Combination gas and liquid suspension devices for vehicles may include a gas chamber on the outside of the unit in surrounding relationship to various liquid-filled cylinders and chambers some of which have oppositely reciprocating valved piston and piston rod components therein to produce damping. Such units have a variable volume liquid-filled reservoir located inwardly of the gas space. In such units, the gas space is usually comunicated with a source of external pressure to charge the gas space through means of a fluid fitting on an outside cylinder of the assembly. Such combination gas and oil shock absorbers are suitable for their intended purpose. However, the outer gas space surrounds the liquid within the unit to reduce heat transfer from liquid in the unit. Furthermore, external fittings on units of the aforementioned type can be damaged.

Another class of combination liquid and gas suspension devices for vehicles includes a gas chamber formed on the outer surface of an inner liquid-filled cylinder. A liquid-filled variable volume reservoir is located on the outside of the unit and is formed in part by a flexible bladder portion of the aforementioned gas space and an outer cylinder component of the assembly. Such units have the advantage of providing a good heat transfer path from the liquid within the device to the surrounding ambient. However, in these arrangements it is difficult to charge the gas space with a predetermined amount of gas pressure and to assure that the gas charge will be maintained sealed within the gas space formed between the flexible bladder and the inner cylinder.

Accordingly, an object of the present invention is to provide new and improved combination gas and liquid suspension devices for vehicles of the type including an inner liquid-filled cylinder surrounded by a sleeve-like flexible bladder forming a gas space located within an outer cylindrical member to define a variable volume liquid-filled reservoir for the device and wherein an open end on the outer cylindrical member is closed by an end cap member.

Still another object of the present invention is to provide a new and improved combination gas and liquid suspension devices for vehilces of the type including a liquid-filled inner cylinder surrounded by a flexible bladder member defining a gas space located within an outer cylindrical member which defines a variable volume liquid-filled reservoir in conjunction with the flexible bladder member located outwardly of the inner cylinder and gas space for improved heat transfer from liquid within the reservoir across the wall of the outer cylinder to the surrounding ambient.

Still another object of the present invention is to provide an improved combination gas and liquid suspension device for a vehicle by the provision of an inner cylinder having a flange on either end thereof forming a bladder sealing surface, a first end closure member on one end of the inner cylinder having a sealing surface formed thereon and a second end closure member on the opposite end of the inner cylinder having a sealing surface thereon and wherein a sleeve-like bladder is formed coaxially of and in spaced relationship to the inner cylinder having a flange portion on each end thereof located between the flange portions of the inner cylinder and the sealing surfaces of the end closure members of the inner cylinder for tightly sealing the bladder with respect to the ends of the inner cylinder to form a sealed gas space and wherein the sealed gas space is surrounded by a liquid reservoir formed in part by an open ended outer cylinder closed by an end cap which bears against one of the end closure members to maintain the sealed relationship between the inner cylinder and the bladder.

Yet another object of the present invention is to provide an improved gas and liquid suspension device for a vehicle having an internally located gas chamber formed in part by an inner cylinder and a flexible sleeve bladder having a gas inlet formed by a valve means formed between the inner cylinder and the flexible bladder and wherein the inner cylinder and flexible bladder are located within an open ended outer cylinder which is closed at one end thereof by an end cap member having first high pressure seal means thereon sealing the outer cylinder and second high pressure seal means thereon sealing a piston rod extending from the inner cylinder through the end cap and reciprocable with respect to the inner cylinder and wherein gas is directed through the valve means when the end cap is removed and is sealed internally of the unit when the end cap is assembled on the outer cylinder.

Further objects and advantages of the present invention will be apparent from the following detailed description, reference being had to the accompanying drawings wherein a preferrred embodiment of the present invention is clearly shown.

IN THE DRAWINGS:

FIG. 1 is a vertical sectional view of a combination gas and liquid suspension device for a vehicle showing the component parts partially assembled prior to a gas charge step;

FIG. 2 is a vertical sectional view of the device in FIG. 1 following assembly;

Figure 3:
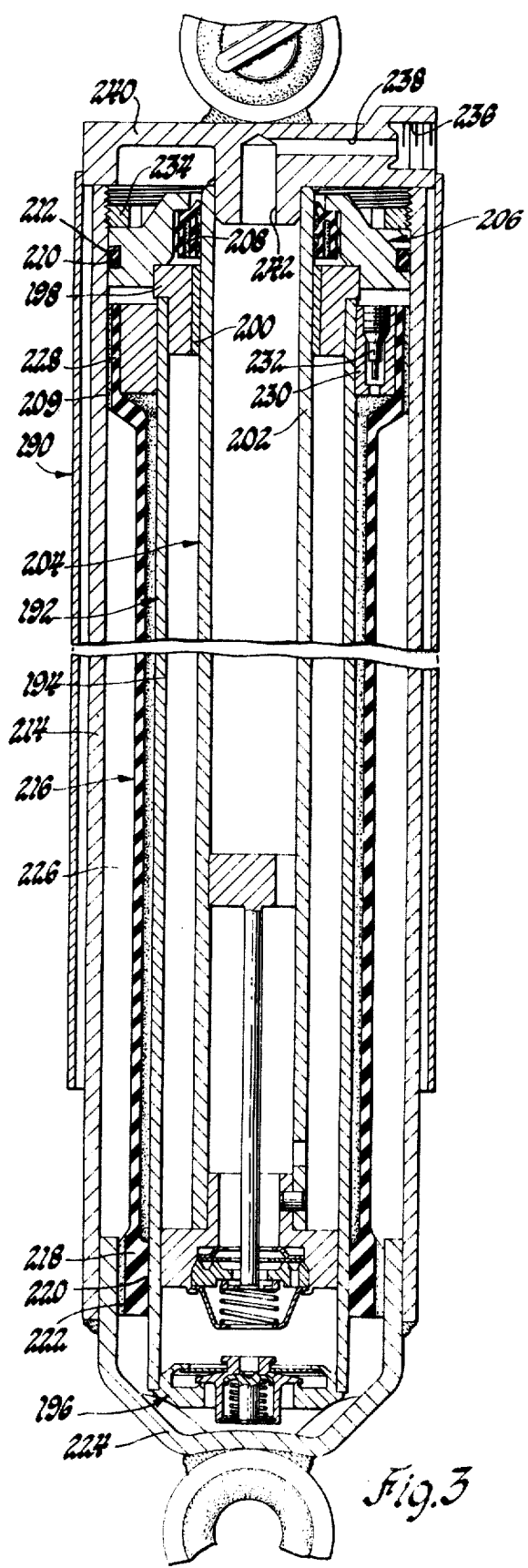
Figure 4:
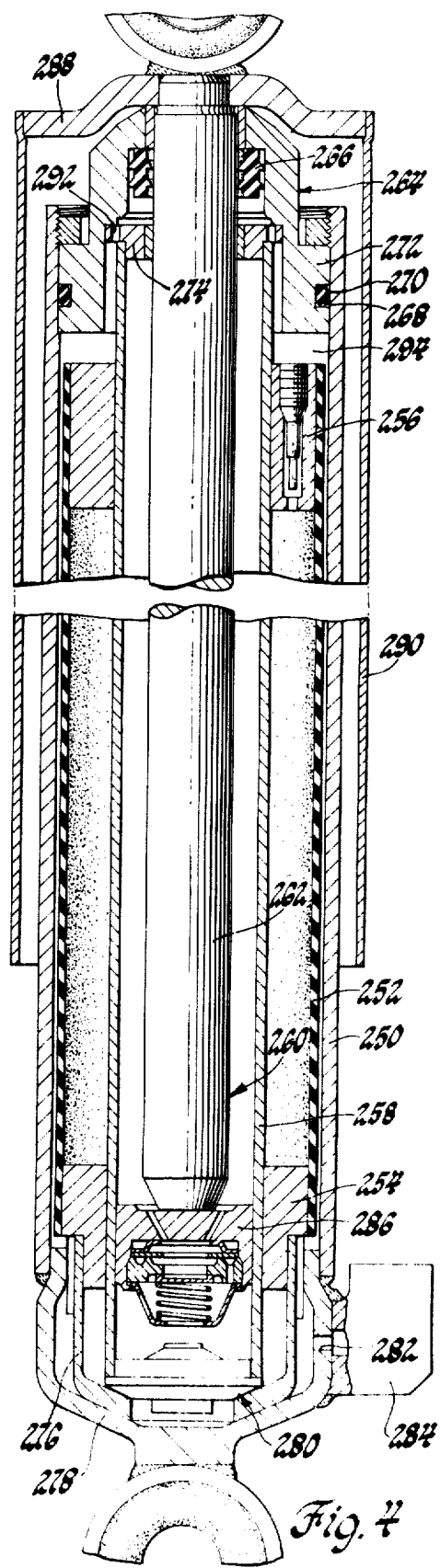

FIG. 3 is a vertical sectional view of another embodiment of a gas and liquid suspension device for a vehicle assembled in accordance with the method of the present invention and including a modified gas inlet to the gas chamber therein; and FIG. 4 is a vertical sectional view of a combination gas and liquid suspension device for a vehicle like that in FIG. 3 with a modified oil charge fitting thereon.

Referring now to FIG. 2 of the drawings, a combination gas and liquid suspension device 10 is illustrated having an oil-filled inner cylinder 12 with a radial flange 14 formed on one end thereof and a like radial flange 16 formed on the opposite end thereof. The upper end of the inner oil-filled cylinder 12 is partly closed by a tubular extension 18 on a rod guide member 20 which has a flanged head 22 thereon located in spaced relationship to the flange 14. The underside of the head 22 includes a peripherally ridged, depending sealing surface 24 thereon which is located in tight sealing engagement with the upper surface 26 on a radially inwardly directed flanged head or bead 28 of a flexible sleeve bladder 30.

The sleeve bladder 30 is formed as an elongated member coaxially of the outer surface of the inner cylinder 12 in spaced relationship thereto. The opposite end of the bladder 30 has a radially inwardly directed flange or bead 32 which fits over the flange 16 and is held in sealing engagement therewith by a base valve assembly 34.

More particularly, the base valve assembly 34 includes a housing 36 having a tubular extension 38 directed into the lower end of the inner cylinder 12. It further includes a radially outwardly directed flange 40 thereon with a peripherally ridged sealing surface 42 located in tight sealing engagement with the flange 32.

Accordingly, the inner 12 and bladder 30 together form a sealed gas space 43 interiorly of the unit 10 along the length of the inner cylinder 12.

A piston 44 is located within the cylinder 12 and has the outer periphery thereof in sliding engagement with the inner wall of the cylinder 12. The piston 44 has an upstanding tubular extension 46 thereon fastened by means of a pin 48 to the end of a hollow piston rod 50 which has the other end thereof connected to an end member 52 by means of a weld 54.

The member 52 is connected to a mounting ring 56 by means of a weld 58. Member 52 further includes a side inlet fitting 60 in communication with a transverse passageway 62 communicated by means of an axial bore 64 to the inside of the rod 50. The bore 64 is formed in an extension 66 on the member 52 which is fit in the upper open end of the piston rod 50. The rod 50 has a side port 67 for communicating the rod interior with the interior of cylinder 12.

The member 52 further serves a support for an elongated dust shield member 68 which is located in telescoping relationship with the outside surface of an outer reservoir cylinder 70. More particularly, the dust shield 68 is connected at the upper end thereof to the outer periphery of the member 52 and the bottom open end thereof is located between the ends of the outer cylinder 70 as best seen in FIG. 2. It has a length so that when the piston rod 50 is fully extended from the cylinder 12 it will cover the rod as seen in FIG. 1 to protect it against dirt, moisture and the like.

The reservoir cylinder 70 has the lower open end thereof closed by a cup member 72 which in turn is connected by means of a weld 74 to a bottom mounting ring 76.

The upper open end of the reservoir cylinder 70 is closed by an end cap and seal housing 78. More particularly, the seal housing 78 includes an inwardly located depending flange 80 which fits around the outer periphery of the head 22. The flange 80 is spaced radially inwardly of the inner surface of the upper end of the reservoir cylinder 70 to define an annular opening in which is located an O-ring seal 82 which provides a high pressure seal between the housing 78 and the cylinder 70.

The housing 78 further includes a radially inwardly located extension 84 located coaxially of the piston rod 50. It includes a radially inwardly directed flange 86 thereon which overlies the upper end of a multi-lip seal member 88 located within a bore 90 through the center of the housing 78. The member 88 has the inner lips thereon in engagement with the outer periphery of the piston rod 50 to define a high pressure seal between the seal housing 78 and the piston rod as it reciprocates exteriorly of and into the inner cylinder 12.

The upper end of the reservoir cylinder 70 is internally threaded at 92 and has a threaded retainer ring 94 threadably received therein. The retainer ring includes a depending circumferential flange 96 thereon which engages an outer surface 98 on the housing 78 to hold an inner surface 100 thereon against a top surface 102 of the rod guide member 20. This in turn holds the ridged surface 24 thereon against the bead 28 of the flexible sleeve bladder 30.

The ring 94 also serves to force the flange 16 on the inner cylinder 12 against the sleeve bead 32 which is held thereby in sealing engagement with the ridged surface 42 on the flange 40 of the base valve assembly 34. The bottom 104 of the housing 36 is seated against a plurality of ribs 106 formed on the inside surface of the cup member 72 to form a plurality of circumferentially spaced passageways 108 which communicate a space 110 below the base valve assembly with an oil-filled reservoir space 112 formed between the bladder 30 and the reservoir cylinder 70.

In this embodiment of the invention, the base valve assembly 34 controls oil flow from the oil-filled inner cylinder 12 to the reservoir space 112. More particularly, it includes an intake valve 114 having a flanged head 116 maintained in sealed seated relationship with an annular valve seat 118 formed on the valve housing 36 around a central opening 120 therethrough. The flanged head 116 is engaged by an intake valve spring 122 which is held in place by a retainer ring 124 snap fit in the inner surface of the extension 38. The intake valve opens to flow of oil from the reservoir space 112, through the passageways 108, space 110 and the bore 120 as the piston rod 50 moves exteriorly of the inner cylinder 12 during its rebound movement.

The base valve assembly 34 further includes a compression valve having a valve element 126 located coaxially within an inside bore 128 of the valve member 114. The valving element 126 includes a side opening 129 in communication with an end opening 130 therein. A compression spring 132 is located between a snap ring 134 and a flange on the element 126 to maintain the element in sealed engagement with an inner seat 136 on the member 114.

During a compression stroke, piston rod 50 moves interiorly of the cylinder 12 and an amount of oil volume equivalent to the volume displaced by the piston rod 50 is directed against the valve element 126. It is moved against the force of the spring 132 to communicate the opening 129 with the bore 128. Oil will pass therethrough and thence through the passageways 108 into the variable volume oil reservoir chamber 112. This action occurs when the piston rod 50 is moved at a substantial velocity with respect to the cylinder 12. At lower relative volocities oil is displaced from the oil filled cylinder 12 into the reservoir chamber across the reduced cross-section of a flow controlling orifice 138 in the member 114.

The piston 44 divides the pressure cylinder 12 into a rebound chamber 140 and a compression chamber 142. It includes valving components for regulating fluid flow between these chambers during reciprocation of the piston rod 50 into and out of the cylinder 12. More particularly, the piston valve includes a valve plate 144 having an orifice 146 therein normally closed by a valving element 148 which is maintained in sealed engagement with the underside of the plate 144 by means of a compression spring 150 having one end thereof in engagement with the valve plate 148 and the opposite end thereof carried by a perforated valve cage 152 which is secured to the piston 44 by a turned over flange 154.

The opposite face of the plate 144 has a valve disc 156 supported thereon in engagement with a valve seat 158 formed around an annular groove leading to a plurality of circumferentially spaced orifices 160 through which oil will flow from the compression chamber 142 into the rebound chamber 140 as the piston rod 50 enters the cylinder 12. The valve disc 156 is spring biased against the seat by means of a spider configured spring retainer 162 in engagement with a peripheral radially inwardly directed surface 164 formed at one end of a bore 166 through the extension 46.

The aforedescribed piston and base valve assembly valving is representative of valving which will be adapted for association with the improved method of the present invention. In the illustrated embodiment, the valved piston 44 is associated with a thermal control member 168 which has one end 170 thereof secured within the hollow piston 50. The end 170 has an opening 172 therethrough for communicating the bore 64 with the piston 44.

The control member 168 has a depending stem portion 174 thereon which extends coaxially through the piston valving components. The distal end 175 of portion 174 located on the outer face of the valve plate 144 overlies a central opening 177 in disc 148. During low temperature operation, the member 168 will have its stem cooled to contract. This moves end 175 from opeening 177 to reduce restriction across the piston 44. As the oil is heated during operation of the device, the stem expands to move end 175 to close the opening 177 as seen in FIGS. 1 and 2. This causes piston restriction to be through orifices 146 and 160.

By virtue of the aforedescribed arrangement, the gas space 43 in the arrangement is located in surrounding relationship to the inner cylinder 12 and the oil reservoir space 112 is located to be cooled by air flow across the outer surface of the reservoir cylinder 70. Another advantage of the aforedescribed arrangement is that a dual high pressure seal configuration is located in a common member defined by seal housing 78 to seal both the radially outwardly located oil reservoir chamber and the piston rod as it moves into and out of the cylinder 12.

Another feature of the present invention is that a return path for oil flow is provided from the rebound chamber 140 back to the reservoir chamber 112. This path is defined in part by a close clearance between a sleeve bearing 176 extending coaxially through the rod guide member 20 to support the piston rod 50 during its reciprocal movement with respect to the cylinder 12. Any oil leakage across this clearance is sealed by the internal lips on the seal member 88 and held within a space 178 located between the rod guide member 20 and the inside of the seal housing 78. The space 178 connects to a lateral passageway 180 formed between the housing 78 and the rod guide 20 to communicate the oil bleed space 178 with the reservoir space 112. The bead 28 of the sleeve 30 has a plurality of circumferentially spaced ribs 182 thereon which space the bead from the inner surface of the cylinder 70. Likewise, the bottom bead 32 has a plurality of circumferentially spaced ribs 184 thereon which engage the inner surface of the opposite end of the cylinder 70 to permit free flow of oil from the base valve assembly 34 to and from the reservoir space 112.

Another aspect of the present invention is that the aforedescribed arrangement for forming a sealed gas space in a combination gas and liquid suspension device further has the advantage of simplifying its manufacture. This method includes the step of making a first sub-assembly that includes the outer cylinder 70 and cup member 72. A second sub-assembly is formed by fastening the flanged heads 28, 32 of sleeve 30 over the radially outwardly directed flanges 14 and 16 on the pressure cylinder 12. The base valve asembly 34 is then located on the end of the cylinder 12 by inserting the extension 38 thereon into the open end of the cylinder 12 at the flange 16.

A third sub-assembly is made which includes the valved piston 44 connected to the piston rod 50. The rod guide member 20 is slidably supported on the outer periphery of the rod 50 and the seal housing assembly 78 is also aligned thereof with the multi-lip seal member 88 located in sealing engagement with the outer periphery of the rod 50. The opposite end of the rod 50 is connected to the end member 52 which in turn is connected to the dust shield 68.

In practicing the method, the sub-assembly including the cylinder 12, valve assembly 34 and bladder 30 are located within the interior of the outer cylinder 70. At this point in the method, the bladder flanges 28 and 32 are loosely connected with respect to the flanges 14 and 16 on the cylinder 12 and there also is a space formed between the bladder flange 32 and the sealing surface 42 on the valve housing 36.

Following this step, the third subassembly is aligned with the previously assembled first and second sub-assemblies and the valve piston 44 is located within the cylinder 12 as seen in FIG. 1. The extension 18 on the rod guide member 20 is located in the open end of the cylinder 12 adjacent the flange 14 thereon so as to maintain a loose fit between the flanged bead 28 of the bladder 30 and the sealing surface 24 on the rod guide member. Additionally, there is an opening or space that is maintained between the flange 14 and the flanged bead 28.

At this point the seal housing 78 is maintained against the end surface 102 on the rod guide as shown in FIG. 1 and the retainer ring 94 is adjusted to that the loose relationship will be maintained between the ends of the bladder and sealing surfaces on adjacent parts. Following the aforementioned alignment steps, a source of gas pressure is connected to the side inlet fitting 60 and the unit is charged with gas to a predetermined pressure.

At the time of the gas charge the flexible gas bladder 30, and the other internal components are all located within the outer cylinder 70 in close proximity to their finally assembled positions. Furthermore, the valve housing 78 is installed in a manner so as to maintain a pressure seal between it and the outer cylinder 70 and the inner rod 50. However, at the time of the gas charge, the inner parts are maintained loosely with respect to each other so as to permit free flow of gas through the unit. During the gas charge step, the piston rod 50 is in a fully extended position as shown in FIG. 1. Gas will flow through the transverse passageway 62, the bore 64 and the interior of the piston rod 50. Valve 148 is opened to permit gas flow therefrom across the base valve assembly into both the reservoir space 112 and gas space 43. The loose connection between the bladder and the inner cylinder 12 permits free flow of gas into the interiorly located gas space 43. When a suitable gas charge pressure is attained, the end cap or seal housing 78 is forced farther into the outer cylinder 70 by the retaining ring 94 to force the rod guide 20 against the bead 28 to seal it between the sealing surface 24 and the flange 14. Simultaneously, the opposite bead 32 on the bladder 30 is squeezed between the flange 16 and the sealing surface 42 whereby the flexible gas bladder 30 is sealed at both its ends. The end cap is then locked in position.

The next step in the method of manufacture is to release the gas pressure at the fitting 60. The gas pressure trapped in the space 43 causes it to be the only chamber in the unit which is charged with gas.

The fitting 60 is then connected to a source of liquid and charged with liquid through the passageways 62, bore 64 and the interior of the piston rod 50. The valve 148 is opened so that liquid will completely fill the inner cylinder 12. The same time the liquid flow will pass across the base valve assembly 34 and into the liquid reservoir 112. As the liquid fill progresses, gas is progressively forced from the piston rod 50 and the inner cylinder 12 to be collected in the space defined by the reservoir space 112. This gas is then forced by the liquid charge through the passageways formed between the ribs 182 and will eventually collect in the space 178 from whence it will be purged across the multi-lip seal 88. When the liquid charge pressure is higher than the gas pressure in the space 42, all gas will have been purged from the space 178 to produce complete oil fill in the tube 50, the cylinder 12 and the reservoir space 112. At this time, the gas chamber or space 42 is completely surroudned by liquid and liquid is in direct contact with the outer shell for heat transfer exchange therebetween.

The above-described method of manufacture is suitable for production type assembly with the sub-assemblies being formed apart from one another and then aligned and installed and charged to produce a sealed gas charge within the interior of a combination gas and liquid suspension device by maintaining parts loosely assembled during the gas charge and oil charge steps and thereafter finally locating internal components by a simple adjustment from exteriorly of the assembled device.

FIG. 3 shows another embodiment of an air oil shock absorber 190 with an internal sub-assembly 192 including an inner cylinder 194 enclosed at the lower end thereof by a base valve assembly 196 corresponding to the base valve assembly 34 in the first embodiment. The opposite end of the inner cylinder 192 is closed by a rod guide member 198 which supportingly receives a sleeve bearing 200 that guides the piston rod 202 of a pistong rod guide charging assembly 204 corresponding to the valved piston 44, piston rod 50, end member 52 and dust shield of the first embodiment.

In this arrangement, the rod guide member 198 is held in the open upper end of the inner cylinder 194 by a seal housing 206 corresponding to the seal housing 78 in the first embodiment. A multi-lip seal member 208 engages the rod 202 to seal the outer periphery thereof. A second high pressure seal 210 is located within a peripheral groove 212 of the housing 206 to seal against the inner surface of an oil reservoir forming outer cylinder 214.

A tubular gas space forming bladder sleeve 216 has a flanged head 218 at the lower end thereof bonded at an interface 220 to the outer surface of the inner cylinder 192 adjacent the base valve assembly 196. It includes a plurality of radially outwardly directed circumferentially spaced ribs 222 thereon engaging the inner surface of the open end of a cup-shaped end member 224 that closes the lower end of the outer cylinder 214. Ribs 222 define a flow opening between the base valve assembly 196 and a liquid filled reservoir 226 formed between the bladder 216 and the outer cylinder 214. The opposite end 228 of the bladder 216 is bonded to a ring member 230 which supports a gas charge valve 232. The gas charge valve 232 is sealed within the interior of the combination unit 190 once the unit is charged with gas and oil.

In this embodiment of the invention, the seal housing 206 includes a dual high pressure seal arrangement which will maintain high pressure conditions within the unit. Furthermore, internal components of the unit are readily retained in their assembled position externally of the unit by adjustment of a threaded retainer ring 234 corresponding to alike ring 94 in the first embodiment. This ring 234 will positively seat the internal components with respect to one another within the outer cylinder 214 following charging thereby to seal the gas charge passageway through the charge valve 232 within the unit. In this embodiment, oil charge is through a side port 236, a transverse passageway 238 in a head 240 thence through a bore 242. The oil charging passageways otherwise are as defined in the first embodiment of the invention.

In this embodiment of the invention, the improved method of assembly includes forming a first sub-assembly made of the outer cylinder 214 and the end cap 224. Thereafter, a second sub-assembly is made including the inner cylinder 194 having the bladder adhered to each end thereof to form a gas space between the inner cylinder 194 and the bladder 216. In this embodiment, the tube and bladder assembly are inserted in the outer cylinder 214 and the gas space between the bladder 216 and inner cylinder 194 is charged with gas to a predetermined pressure through the gas charge valve 232. Following gas charge the internal assembly 204 is directed into the inner cylinder 194 and the seal housing 206 is placed thereon. This seats the internal components and seals the gas charge valve and the passageway therethrough.

Once the unit has been charged with gas and the passageway into the gas space has been sealed, the unit is charged with liquid. In this embodiment, the liquid charge occurs through the side port fitting 236. When the unit is completely filled with oil, the pressure of the liquid charge will exceed the gas pressure within the bladder 216 to cause it to compress leaving the bladder 216 completely surrounded by liquid. Gas is bled from the unit during liquid charge across the seal 208 as was the case in the first embodiment. This occurs through openings between circumferentially spaced ribs 209 on end 228 of bladder 216.

Another embodiment of the invention is illustrated in FIG. 4. It includes an outer cylinder 250 corresponding to the outer cylinder 214 in the second embodiment. Radially inwardly of the outer cylinder 250 is located a tubular bladder or sleeve element 252 which is sealed at its opposite ends to a pair of spaced apart rings 254, 256.

Each of the rings 254, 256 has the inner periphery thereof sealed to the outer surface of a piston tube or inner cylinder 258 to form a liquid filled cylinder in which is located a piston rod and piston assembly 260. In this arrangement, the piston is a solid piston 262 which extends exteriorly of the outer cylinder 250 through a dual pressure seal housing 264 which supports a first high pressure seal 266 located against the outer periphery of the rod 262 for providing a first high pressure seal thereagainst. The unit further includes a second high pressure O-ring seal 268 located in a peripheral groove 270 in the base 272 of the housing 264. Seal 268 engages the inner surface of the outer reservoir cylinder 250 at one end thereof. Furthermore, housing 264 serves as the element for retaining a rod guide 274 against the upper end of the inner cylinder 258 for closing the same. Adjustment of the housing 264 also seats the bottom ring 254 against the upper edge of a spacer element 276 located between a bottom base cup 278 and a base valve assembly 180. The spacer element 276 is located adjacent a feed port 282 connected to a liquid charge fitting 284 on the side of the bottom base cup.

In this arrangement the internal components include a valve piston assembly 286 and the piston rod 262 is connected to an end cap 288 which in turn is conected to an outwardly located telescoping dust shield 290.

In this arrangement of the invention, the method of assembly is like that in the embodiment of the invention disclosed in FIG. 3. The liquid charging step, however, is through the bottom oil fitting 284. In this arrangment, the gas in the internal chambers of the shock absorber is purged during the oil charge step through a port 292 formed in the rod guide member 274. It is in communication with the cavity of the seal 266 and a liquid reservoir chamber 294 between the bladder 252 and the outer reservoir 250.

While the embodiments of the present invention, as herein disclosed, constitute a preferred form, it is to be understood that other forms might be adopted.

What is claimed is:

1. A combination gas and liquid suspension device for a vehicle comprising a liquid filled inner cuylinder having opposite open ends, each end having a radially extending annular flange, a rod guide member connected in one end of the inner cylinder, base valve means connected in the opposite end of said inner cylinder, a piston slidably supported within said inner cylinder for opposite reciprocation therein, a piston rod connected to said piston having one end thereof extending through said rod guide member exteriorly of said inner cylinder, a flexible sleeve bladder located coaxially of the inner cylinder in spaced relationship to the outer surface thereof to form a gas space, said bladder having ring-like opposite end portions extending radially inwardly therefrom to provide gas seals for said bladder, one of said end portions of said bladder being operatively positioned between one of said flanges of said inner cylinder and said rod guide means to seal one end of said gas space, the other of said end portions being operatively positioned between the other of said flanges of said inner cylinder and said base valve means to seal the other end of said gas space, an outer cylinder member located coaxially of and in surrounding relationship with said bladder, means closing one end of said outer cylinder and including means thereon cooperating with said base valve means to define an oil path from the inner cylinder to a reservoir space between the bladder and the outer cylinder, said outer cylinder having an opposite open end therein, an end cap adjustably mounted in and closing the opposite open end, first seal means operatively connected between said end cap and the outer cylinder to form a pressure seal at the outer cylinder, second seal means on the end cap for forming a pressure seal between it and the reciprocating piston rod, and adjustable means for positioning and locking said end cap in said outer cylinder to locate said first and second seals in sealing relationship with said outer cylinder and said piston rod and to hold said end portions of said bladder in sealing relationship with said annular flanges of said inner cylinder, said rod guide and said base valve means.

2. A combination gas and liquid suspension device for a vehicle comprising a liquid filled inner cylinder having opposite open ends thereon, each of said open ends having a radially extending sealing surface, a rod guide member connected in one end of the inner cylinder having a sealing surface thereon located in spaced relationship to the sealing surface on one end of the inner cylinder, base valve means connected in the opposite end of said inner cylinder having a sealing surface thereon located in spaced relationship to the sealing surface on the opposite end of said inner cylinder, a piston slidably supported wihtin said inner cylinder for opposite reciprocation therein, a piston rod connected to said piston having one end thereof extending through said rod guide member exteriorly of said inner cylinder, means for directing liquid through said piston rod into said inner cylinder, a flexible sleeve bladder located coaxially of the inner cylinder in spaced relationship to the outer surface thereof to form a gas space, said bladder having opposite end portions extending radially inwardly therefrom forming first and second sealing beads, one of said end portions being located between the sealing surfaces on said rod guide and said inner cylinder to seal one end of the gas space, the other end portion of said bladder being located between said sealing surfaces on said base valve and the opposite end of said inner cylinder to seal the opposite end of said gas space, an outer cylinder member located coaxially of and in surrounding relationship with said bladder, closure means closing one end of said outer cylinder and including means thereon cooperating with said base valve means to define a fluid path from the inner cylinder to a reservoir space between the bladder and the outer cylinder to receive liquid from said outlet means to vary the liquid volume in said reservoir space and to change the pressure in said gas space, said outer cylinder having an open end therein, an end cap adjustably mounted in and closing the open end, first seal means on the end cap connected between it and the outer cylinder to form a pressure seal at the outer cyinder, second seal means on the end cap for forming a pressure seal between it and the reciprocating piston rod, retainer ring means threaded into one end of said outer cylinder for moving said end cap toward said closure means for pressing said sealing beads between the inner cylinder and those on said rod guide member and said base valve means for maintaining the bladder in tight seal engagement with the inner cylinder to prevent the escape of gas from the inner space into the liquid filled reservoir and inner cylinder.

3. A combination gas and liquid suspension device for a vehicle comprising a liquid filled inner cylinder having opposite open ends, a rod guide closing one of the open ends and a base valve means closing the other of the open ends, a piston located within said inner cylinder slidably supported thereon for opposite reciprocation therein, a piston rod connected to said piston having one end thereof extending through said rod guide exteriorly of said inner cylinder, an outer cylinder member located coaxially of the inner cylinder in surrounding spaced relationship therewith, a ring member connected to the inner surface of said inner cylinder at each end thereof, means forming a fluid inlet through one of said ring members, a flexible sleeve bladder having radially extending opposite ends, one of said sleeve ends being sealed between one of said rings and one end of said inner cylinder, the other of said opposite ends being sealed between the other of said rings and the other end of said inner cylinder to form a sealed gas chamber between said inner cylinder and said sleeve, said bladder being located in spaced relationship to said outer cylinder along the length of said outer cylinder to form a variable volume oil filled reservoir chamber therewith, passageway means communicating the inner cylinder with the reservoir space, said passageway means including a first end cap closing one end of said outer cylinder, a second end cap closing the opposite end of said outer cylinder including first seal means thereon for forming a pressure seal between it and the outer cylinder, second seal means on said second end cap for forming a pressure seal between it and the piston rod as it reciprocates into and out of the inner cylinder, retainer means threaded into said outer cylinder directly engaging said second end cap for retaining the second end cap in its sealed relationship with the outer cylinder and the piston rod and for holding the rod guide in place within the open end of the inner cylinder, and means for directing liquid into the inner cylinder and oil reservoir.

4. A combination gas and liquid suspension device for a vehicle comprising a liquid filled inner cylinder having opposite open ends, a rod guide closing one of the open ends and a base valve means closing the other of the open ends, a piston located within said inner cylinder slidably supported thereon for opposite reciprocation therein, a piston rod connected to said piston having one end thereof extending through said rod guide exteriorly of said inner cylinder, an outer cylinder member located coaxially of the inner cylinder in surrounding spaced relationship therewith, a ring member connected to said inner cylinder at each end thereof, means forming a fluid inlet through one of said ring members, a flexible sleeve bladder having opposite ends which extend radially inwardly, one of said sleeve ends being sealed between one of said rings and one end of inner cylinder, the other of said sleeve ends being sealed between the other of said rings and the other end of said inner cylinder to form a sealed gas chamber between said inner cylinder and said sleeve, said bladder being located in spaced relationship to said outer cylinder along the length of said outer cylinder to form a variable volume oil filled reservoir chamber therewith, passageway means communicating the inner cylinder with the reservoir space, said passageway means including a first end cap closing one end of said outer cylinder, a second end cap closing the opposite end of said outer cylinder including first seal means thereon for forming a pressure seal between it and the outer cylinder, second seal means on said second end cap for formina a pressure seal between it and the piston rod as it reciprocates into and out of the inner cylinder, retainer means adjustably threaded in said outer cylinder for contacting and retaining the first end cap in its sealed relationship with the outer cylinder and the piston rod and for holding the rod guide in place within the open end of the inner cylinder, and means for directing liquid into the inner cylinder and oil reservoir including a fitting connected to the piston rod and means for forming a liquid passageway through said piston rod thence interiorly of said inner cylinder and through said passageway means into said oil reservoir, said oil inlet being adapted to be connected to an oil supply system for varying the amount of oil within the oil reservoir to change the oil pressure within the unit, valve means in said piston having an opening therethrough for controlling the flow of oil through said piston and thermally activated means in said piston rod for varying the size of said opening to vary the flow of oil through said piston.

* * * * *